（12） United States Patent
Pontual et al.

(10) Patent No.: US 10,448,104 B1
(45) Date of Patent: Oct. 15, 2019

(54) METHOD AND APPARATUS FOR PROGRAMMING A REMOTE CONTROL USING A DEVICE IDENTIFIER RECEIVED THROUGH AN INTERFACE

(75) Inventors: Romulo Pontual, Palos Verdes, CA (US); Henry Derovanessian, Manhattan Beach, CA (US); Scott D. Casavant, Germantown, MD (US); Jorge H. Guzman, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 343 days.

(21) Appl. No.: 13/458,661

(22) Filed: Apr. 27, 2012

Related U.S. Application Data

(60) Provisional application No. 61/481,045, filed on Apr. 29, 2011.

(51) Int. Cl.
  *H04N 21/458* (2011.01)
  *H04N 21/41* (2011.01)
  *H04N 21/262* (2011.01)

(52) U.S. Cl.
  CPC ....... *H04N 21/4586* (2013.01); *H04N 21/262* (2013.01); *H04N 21/26291* (2013.01); *H04N 21/4126* (2013.01)

(58) Field of Classification Search
  CPC .... G08C 17/02; G08C 2201/92; G08C 23/04; G08C 2201/21; G08C 2201/40
  USPC .............. 725/71, 80–82, 131–133, 139–141, 725/151–153
  See application file for complete search history.

(56) References Cited

U.S. PATENT DOCUMENTS

| | | | |
|---|---|---|---|
| 5,228,077 A * | 7/1993 | Darbee | 379/102.01 |
| 5,410,326 A * | 4/1995 | Goldstein | 348/734 |
| 5,450,079 A * | 9/1995 | Dunaway | 341/23 |
| 5,500,691 A * | 3/1996 | Martin et al. | 348/734 |
| 5,629,868 A | 5/1997 | Tessier et al. | |
| 6,038,625 A * | 3/2000 | Ogino | H04L 12/40058 710/10 |
| 6,104,334 A * | 8/2000 | Allport | 341/175 |
| 6,246,400 B1 | 6/2001 | Bush | |
| 6,421,069 B1 * | 7/2002 | Ludtke | G06F 9/4415 715/762 |
| 2004/0119894 A1 * | 6/2004 | Higgins | H04L 12/2805 348/734 |
| 2004/0123332 A1 | 6/2004 | Hanson | |
| 2004/0158624 A1 * | 8/2004 | Bodin et al. | 709/222 |

(Continued)

OTHER PUBLICATIONS

Notice of Allowance dated Nov. 19, 2012 in U.S. Appl. No. 11/820,532, filed Jun. 20, 2007 by Jorge H. Guzman et al.

(Continued)

*Primary Examiner* — Hsiungfei Peng
(74) *Attorney, Agent, or Firm* — Harness, Dickey & Pierce, P.L.C.

(57) ABSTRACT

A method of programming a remote control and a set top box to control the same includes a network communication module at the set top box receiving a device identifier from an electronic device through an interface. The set top box also includes a communication module obtaining remote control programming code based on the device identifier. A controller controls programming a remote control to control the electronic device based on the remote control programming code.

17 Claims, 5 Drawing Sheets

(56) References Cited

U.S. PATENT DOCUMENTS

| | | | |
|---|---|---|---|
| 2007/0052547 | A1 | 3/2007 | Haughawout et al. |
| 2007/0101367 | A1 | 5/2007 | Lee et al. |
| 2008/0320542 | A1* | 12/2008 | Guzman .............. H04N 5/4403 725/131 |
| 2009/0237573 | A1* | 9/2009 | Hornback .............. G08C 17/02 348/734 |
| 2010/0028010 | A1* | 2/2010 | Zhao .................. H04B 10/1141 398/106 |

OTHER PUBLICATIONS

Non-final Office action dated Sep. 29, 2009 in U.S. Appl. No. 11/820,532, filed Jun. 20, 2007 by Jorge H. Guzman et al.
Final Rejection dated Mar. 29, 2010 in U.S. Appl. No. 11/820,532, filed Jun. 20, 2007 by Jorge H. Guzman et al.

* cited by examiner

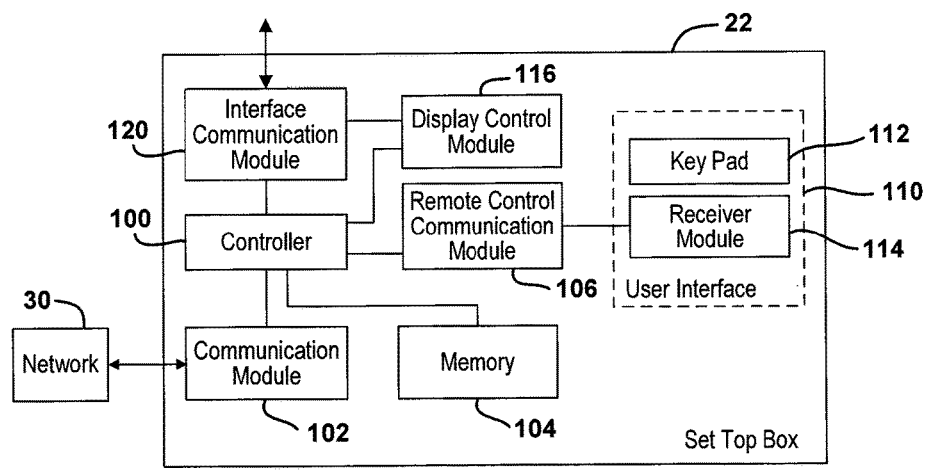
FIG. 2
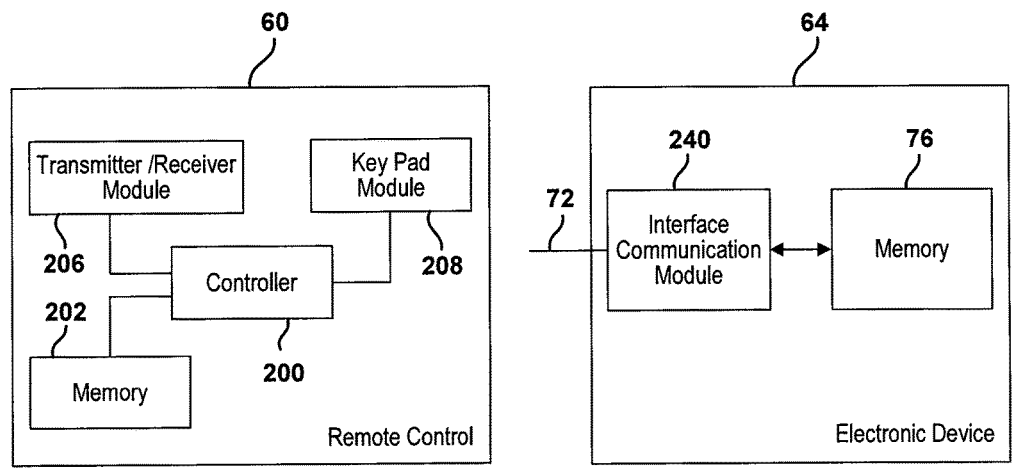
FIG. 3     FIG. 4

METHOD AND APPARATUS FOR PROGRAMMING A REMOTE CONTROL USING A DEVICE IDENTIFIER RECEIVED THROUGH AN INTERFACE

TECHNICAL FIELD

The present disclosure relates generally to programming a remote control device and, more specifically, to programming a remote control device using data received from the device to be controlled.

BACKGROUND

The statements in this section merely provide background information related to the present disclosure and may not constitute prior art.

Remote control devices are used for controlling various pieces of electronic equipment. Typically, each piece of electronic entertainment equipment comes with a separate remote control. Some remote control devices may be programmed to perform functions on other electronic devices.

Television set top boxes, such as satellite set top boxes, may include a remote control database to aid a consumer to program a remote control to be used to control various other devices such as televisions, DVD players, and audio systems. As a number of devices increases, the database in the set top box grows continuously taking more space in non-volatile storage. The non-volatile storage used for controlling remote controls are used only a few times and, thus, become wasted space.

The database is loaded into the set top box upon manufacture of the set top box. The database is static. However, the set top box may be used for devices not known at the time of the manufacture of the set top box.

One method for controlling a remote control database includes selecting the device and brand name of the device that are stored in the programming codes in the fixed database. The user programs the remote control with one of the codes and tests the remote control with a desired device. If the device responds, programming is stopped. However, there is a chance that the device may not work and another code may be entered. Several codes may be entered before the proper code for the device is found. This process is a manual cumbersome process.

SUMMARY

The present disclosure receives a device identifier though an interface between the device and set top box. The set top box can use the device identifier to retrieve the proper codes for the remote control.

In one aspect of the disclosure, a method includes communicating a device identifier from an electronic device to a set top box through an interface, obtaining a remote control programming code at the set top box based on the device identifier and programming a remote control to control the electronic device based on the remote control programming code.

In a further aspect of the disclosure, a set top box includes a network communication module receiving a device identifier from an electronic device through an interface. The set top box also includes a communication module obtaining a remote control programming code based on the device identifier. A controller programs a remote control to control the electronic device based on the remote control programming code.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a simplified block diagrammatic view of the set top box according to the present disclosure.

FIG. 3 is a simplified block diagrammatic view of a remote control according to the present disclosure.

FIG. 4 is a simplified block diagrammatic view of the electronic device according to the present disclosure.

Figure 5A:
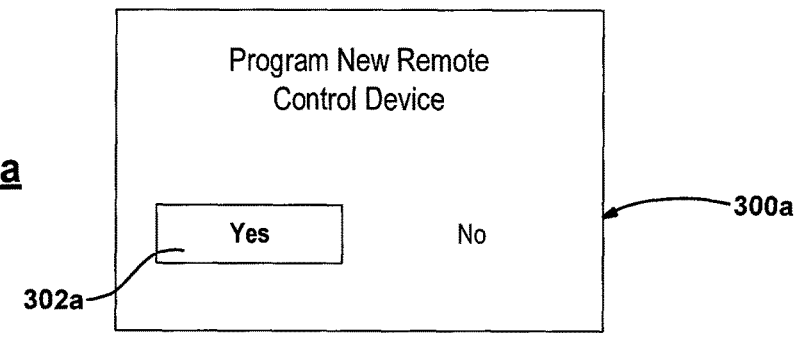
Figure 5B:
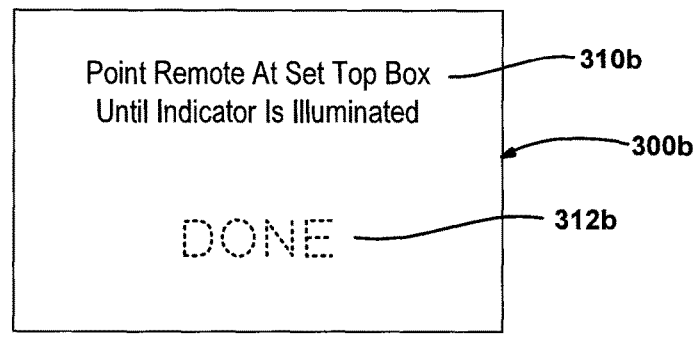
Figure 5C:
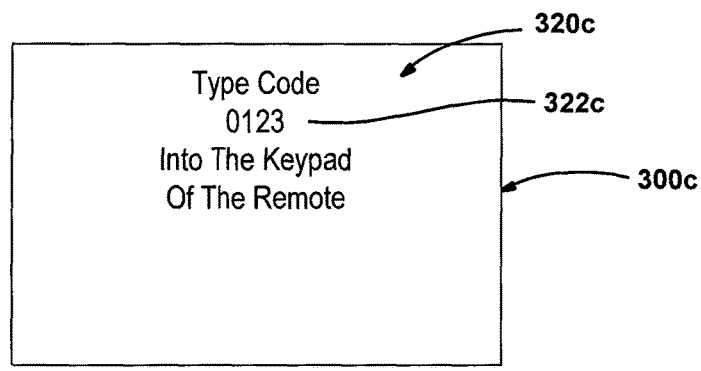

FIGS. 5*a*-5*c* are screen displays of various aspects of programming a remote control device.

Figure 6A:
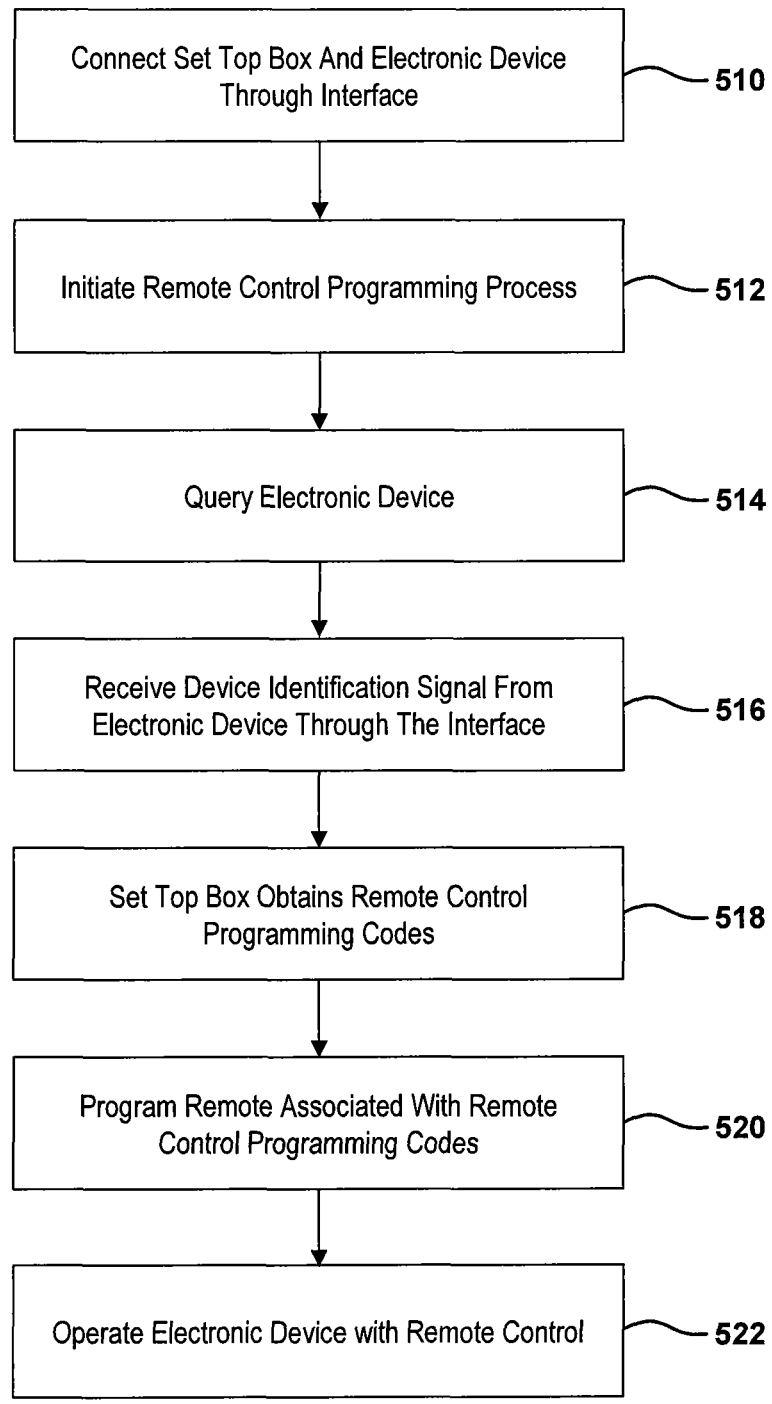

FIG. 6*a* is a flowchart illustrating a first method for operating the present disclosure.

Figure 6B:
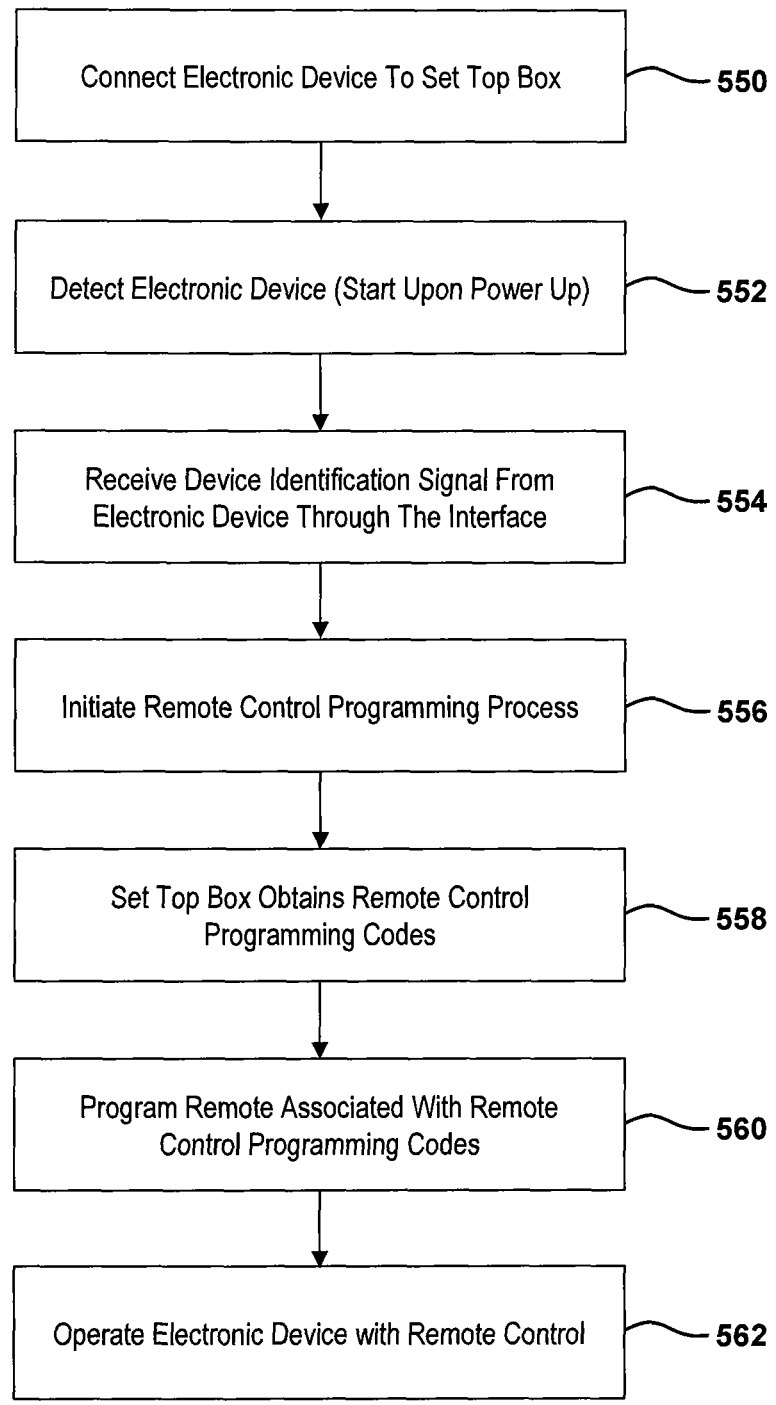

FIG. 6*b* is a flowchart illustrating a second method for operating the present disclosure.

DETAILED DESCRIPTION

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE) and integrated receiver/decoders (IRDs) as described below can be reallocated as desired without departing from the intended scope of the present patent.

Figure 1:
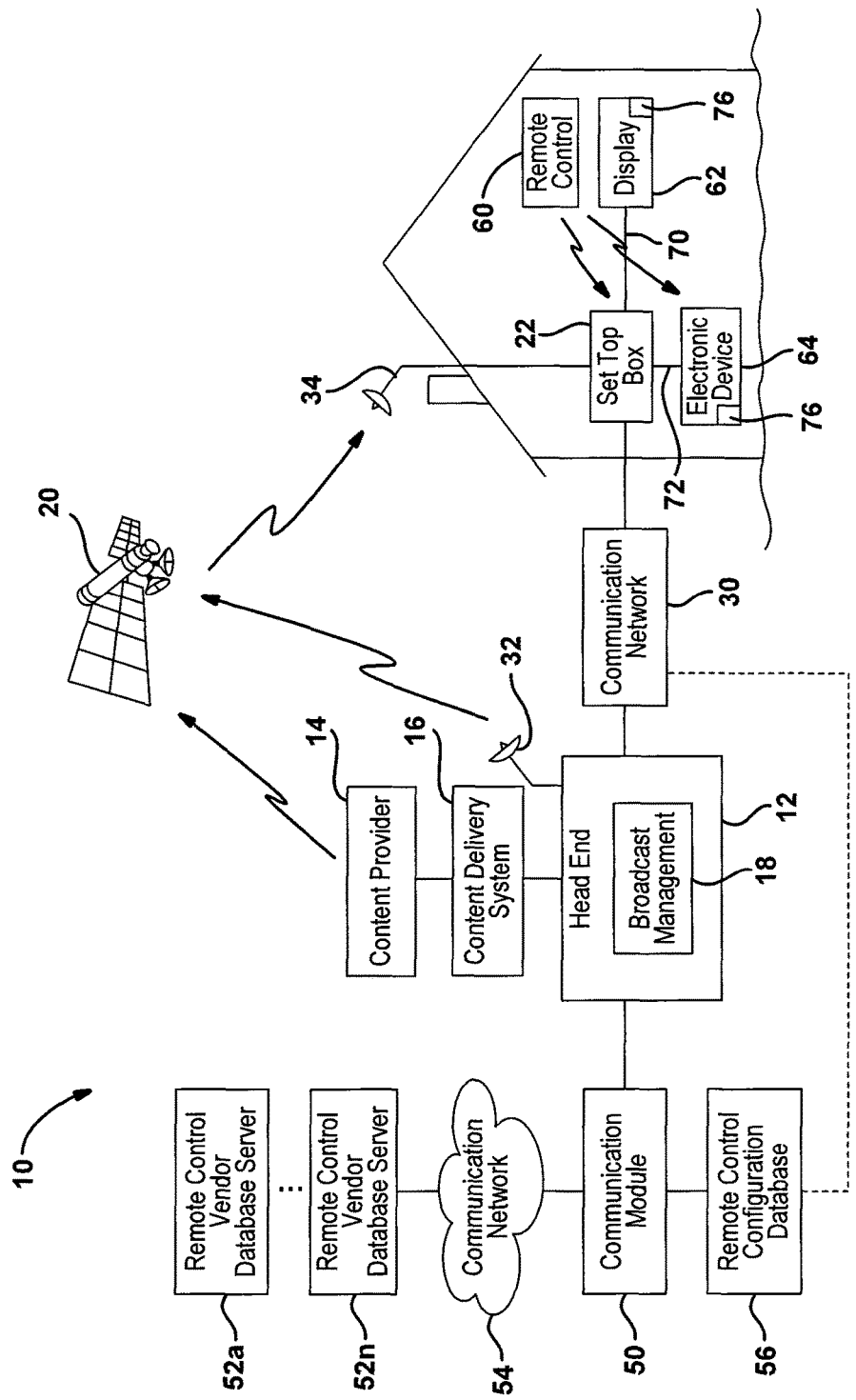
FIG. 1 is a block diagrammatic system double view of the present disclosure.

Referring now to FIG. 1, a communication system 10 includes a head end 12 that is used as a transmission source, a plurality of content providers, one of which is shown as reference numeral 14, and a content delivery system 16. The content providers 14 may deliver content through the content delivery system 16 to the head end 12. The head end 12 may include broadcast management 18 used for broadcasting the content and various other data, such as remote control configuration data as will be described below. A satellite 20 may represent several satellites or a network of satellites. The satellites may be used to communicate the different types of information or portions of content from the head end 12 to a user device such as a set top box 22. The set top box 22 may also be referred to as an integrated receiver decoder. Communications through the satellite 20 may take place at any suitable frequency such as Ka band, Ku band, or both.

In addition to the satellite 20, various types of data, such as security data, encryption and decryption data, content, or a remote control configuration database having remote control programming data may be communicated terrestrially. A communication network 30 such as the public switch telephone network, a terrestrial wireless system, a stratospheric platform, an optical fiber, and coax cable, a twisted pair cable, 3G/4G network, or the like, may be used to terrestrially communicate. In a cable system, all content and the remote control programming data are communicated terrestrially. Data and content may be communicated through an uplink antenna 32 through the satellite 20 which, in turn, communicates the signals to a receiving antenna 34 in communication with the set top box 22.

A communication module 50 may be in communication with the head end 12. It should be noted that the communication module 50 may be included within the head end or as a separate device. The communication module 50 is used for communicating with a remote control vendor database server 52a through 52n. The remote control vendor database server will be referred to collectively as 52. The remote control vendor database server 52 includes a database of the remote control devices provided by the particular vendor. This may include the type of device, the model number and brand of the device, as well as the remote control programming codes used for programming the remote control. The communication module 50 communicates with the remote control vendors through a communication network 54. The communication network 54 may include the various types of communication means set forth with respect to the communication network 30. The communication network 54 may be differently configured than the communication network 30. That is, the communication network 54 in any configuration may be different than the communication network 30 in an implementation.

The communication module 50 is in communication with the remote control configuration database 56. The communication module 50 may be computer-based such as a server. The remote control configuration database 56 may be a memory within the communication module 50 or within the head end 12. The remote control configuration database 56 is updated periodically through the communication module 50. The communication module 50 may receive a notification that the remote control vendor database of a particular remote control vendor has been updated. The communication module 50 may then retrieve the information. The remote control vendor database server 52 may also periodically send updates to the communication module 50 automatically. As is evident, various ways for receiving and updating the remote control configuration database 56 may be performed.

The set top box 22 is in communication with a remote control device 60 and a display 62. The remote control 60 may be infrared, RF or another type of remote control. The display 62 may be a television monitor, computer monitor, portable media player or other types of display device. The display 62 may be in communication with the set top box 22 through an interface 70. The interface 70 may be, but is not limited to, a high-definition multi-media interface (HDMI), a digital video interface (DVI), a video graphics array (VGA), or other type of interface.

An electronic device 64, such as a television, VCR, DVD player, audio system, or the like, may have a remote control input that may be desirable to be controlled by the remote control 60. The electronic device 64 may also be in communication with the set top box through an interface 72. The interface 72 may be configured in a similar manner to that set forth above with respect to the interface 70. Various types of interfaces may be used.

Both the interfaces 70, 72 may support providing identification data therethrough. The identification data may correspond to, but is not limited to, the type of device, manufacturer, or model. One type of format that the interface 70, 72 may support is extended display identification data (EDID). Although EDID is used as an example, various other types of interfaces for communicating identification data may be used.

The present disclosure sets forth a method to allow the remote control 60 to be programmed to operate one or more electronic devices 64. The remote control 60 that is programmed may be the remote control provided by the manufacturer of the set top box 22. The display 62 may be collectively referred to as an electronic device.

The set top box 22 may also be in communication directly with the remote control configuration database 56 through the communication network 30. As will be described below, various ways for the set top box 22 to receive remote control data is set forth. By way of example, the set top box may only retrieve the necessary remote control programming codes from the remote control configuration database based on the electronic device identifier.

The electronic device 64 and the display 62 may have a memory 76. The memory 76 may store vendor or product identification data (an electronic device identifier) therein. The vendor or product identification data may include a model number, a serial number, a manufacturer name, a product identifier, a week of manufacture, a year of manufacture, a software version, and a number of extension flags. Of course, a greater or lesser amount of data may be stored within the memory 76 of either the display 62 or the electronic device 64.

Referring now to FIG. 2, set top box 22 is illustrated in further detail. Set top box 22 includes a controller 100 that is in communication with a communication module 102. The communication module 102 is used to communicate through the communication network 30 or the satellite 20, or both. Communication module 102 may be used to receive various types of data such as the remote control communication database data and other data. Programming content may also be received through the communication module 102. The communication module 102 may be in communication with the communication network 30 and ultimately to the head end 12 for retrieving the remote control programming codes or the remote control configuration database 56. The set top box 22 may also be in communication with a remote control vendor database server 52a-n.

The controller 100 may store the remote control communication database or remote control programming codes within the memory 104. The memory 104 may include various types of memory, including a flash memory or a hard drive. However, only portions of the database, rather than the entire database, need to be stored in the memory 104. However, the entire updated database may be stored as well.

The communication module 102 is capable of monitoring the data and retrieving the data according to the remote control communications module 106. The remote control communications module 106 is used to control the programming of the remote control through the set top box 22. The remote control communication module 106 may be used to generate a screen display as controlled by the controller 100. The screen display may provide various prompts or the like for the user to follow in order to program the remote control device.

The remote control communication module 106 is in communication with a user interface 110 that may include a key pad 112 directly on the set top box or a receiver/transmitter module 114, or both. The receiver/transmitter module 114 may include an RF or infrared transmitter and receiver for communicating with the remote control device. The controller 100 controls the receiver/transmitter module 114 and may be used to automatically control the remote control as will be set forth below. In short, the receiver/transmitter module 114 may be used to transmit communication signals or programming codes to the remote control 60.

The controller 100 may also be coupled to a display control module 116. The display control module 116 may operate in response to the remote control communication module. That is, various screen displays may be generated for the programming of the remote control device. This allows the user to interact with the set top box 22 for the programming. The remote control communication module 106 may be activated using a screen display for configuring the remote control. Once the remote control process is activated through the interface 110, various screen displays may be generated through the display control module 116. The control may be performed through an interface communication module 120. The signals to and from the electronic device may be communicated through the interface communication module 120. The communications module 102 may be used to obtain various information from the remote control configuration database. The operation of the set top box 22 will be more evident in FIGS. 5 and 6.

Referring now to FIG. 3, a remote control 60 is illustrated in further detail. The remote control 60 may include a controller 200 that is coupled to a memory 202. The memory 202 stores various configuration information received from the set top box 22. The controller 200 may be used to control a transmitter/receiver module 206. The transmitter/receiver module may be used to transmit or receive RF or infrared signals to the receiver/transmitter module 114 of the set top box 22 or other electronic devices. A keypad module 208 generates various signals that are communicated through the transmitter module 206 and, ultimately, to the interface 110. The memory 202 may include a database of various types of configurations for the remote control. The keypad module 208, as described below, may be used to configure the remote control 60 to a particular configuration within the remote control database within the memory 202.

Referring now to FIG. 4, the electronic device 64 is illustrated in further detail. The electronic device 64 may include the memory 76 as described above. An interface communication module 240 is in communication with the memory 76. The interface communication module 240 may be used to communicate the various identifiers such as the model identifier, the manufacturer identifier, the device type identifier, and the other types of identifiers described above in FIG. 1. The interface communication module 240 may communicate the identifiers through the interface 72 to the interface communication module 120 of FIG. 2 described above. The interface communication module 240 may format the signal in the desired format such as EDID.

Referring now to FIG. 5a, a screen display 300a is illustrated. The screen display 300a may ultimately include various instructions and selections for programming a remote control device. The screen display 300a may be generated by the display control module 116 of FIG. 2. A selection box 302a may also be included on the screen display 300a. The selection box 302a may be moved in various directions in response to inputs from the keypad module 208 of the remote control 60. In this example, the screen display asks whether a new remote control device is to be programmed. The selections are YES or NO. In this example, the selection box 302a indicates YES.

Referring now to FIG. 5b, a screen display 300b is set forth. Screen display 300b may take place when the programming is being performed. In this example, the remote device may be pointed at the set top box until the indicator is illuminated as set forth in the instructions 310b. Although not illuminated, an instruction 312b may light up or change appearance to indicate the remote control is "done" being programmed. In screen display 300b, an automatic-type program may take place.

Referring now to FIG. 5c, specific instructions may also be provided to the user. In this example, instructions 320c indicate a remote control programming code 322c to be typed into the remote control based upon the type of electronic device that the remote control is being programmed for. In this case, a four-digit code "0123" is set forth. By typing in the code "0123", the remote control will be configured in a predetermined manner so that communication may take place. Various codes such as alphabetic and numeric may be used with differing character lengths.

Referring now to FIG. 6a, one method for operating the remote control configuration is set forth. In step 510, the set top box and the electronic device are coupled together through an interface. As mentioned above, the interface may be an HDMI or other type of electronic interface capable of communicating identifier information from the electronic device to the set top box.

In step 512, the remote control programming process may be initiated. The remote control programming process may be initiated automatically upon the performance of step 510 in which the set top box and the electronic device communicates through the interface. Further, the step of initiating the remote control programming progress may also be performed in response to selecting a selection at the set top box through the user interface 110 of the set top box 22.

In step 514, the set top box generates a query signal to the electronic device through the interface. The query signal may generate a response signal from the electronic device.

In step 516, the electronic device communicates the response such as a device identifier signal to the set top box. The device identifier signal is communicated directly to the set top box through the interface. The set top box receives the device identifier signal from the electronic device through the interface.

In step 518, the set top box obtains the remote control programming codes or data associated with the remote control. As mentioned above, the remote control programming codes or remote control data may be obtained from the set top box or through a communication network 30 illustrated in FIG. 1. Further, the data may also be received at the set top box from the satellite 20. The remote control data may be obtained from the head end 12 or the remote control configuration database 56 through a terrestrial network as well. Further, the remote control programming code may also be obtained directly from the remote control vendor databases 252a-n.

In step 520, the remote is programmed with the control codes that allow the remote to control the electronic device. Programming in step 520 may take place automatically with the set top box communicating signals containing the remote control programming code to the remote control as described in FIG. 4b above. Further, the remote control programming code as illustrated in FIG. 5c may be displayed on a screen display so that the user may type the code into the remote control device and thus program the remote control to communicate with the set top box.

In step 522, once the remote control device is programmed, the remote control may be used to operate the electronic device. As can be seen, the remote control may also be programmed for various numbers of devices if desired. Known types of selector switches may be provided for selecting audio devices, DVDs, VCRs, TVs, and the like based on various types of remote controls. Each selection may be programmed separately.

Referring now to FIG. 6b, another method for programming a remote control is set forth. In this process detection of the electronic device may be initiated automatically at the set top box. In step 550, the electronic device is coupled to the set top box. In step 552, the electronic device is detected. The detection of the electronic device may be performed upon power-up of the set top box or upon the connection itself. In step 554, an identification signal is communicated to the set top box through the interface. In this manner, the set top box already has the identification for the electronic device when programming of the remote control is desired.

In step 556, the remote control programming process may be initiated. As mentioned above, this may be performed right away or at some later time than the initial connection between the set top box and the electronic device. The remote control programming process may be initiated automatically or upon the selection of a menu item displayed by the set top box.

In step 558, the set top box obtains the control programming codes or data associated therewith as was described above relative to step 518. Step 560 corresponds to step 520 in which the remote is programmed with the control codes from step 558. The remote control programming code may be displayed on a screen display so that the user may type the code into the remote control device and thus program the remote control to communicate with the electronic device and the set top box. In step 562, once the remote control device is programmed, the remote control may be used to operate the electronic device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method of programming a remote control to control an electronic device coupled to a set top box, said set top box having a display associated therewith, said method comprising: communicating a device identifier comprising a model identifier of the electronic device and a manufacturer identifier of the electronic device from the electronic device to the set top box through an interface; thereafter, obtaining a remote control programming code at the set top box in response to model identifier and the manufacturer identifier from a remote control configuration database through a terrestrial communication network, said remote control programming code comprises a unique set of numbers or letters for both the model identifier and manufacturer identifier; displaying the remote control programming code on the display associated with the set top box; entering the remote control programming code into the remote control by pressing buttons corresponding to the unique set of numbers or letters; and programming the remote control to control the electronic device based on the remote control programming code.

2. A method as recited in claim 1 wherein obtaining a remote control programming code comprises obtaining the remote control programming code from a memory of the set top box.

3. A method as recited in claim 2 further comprising broadcasting a remote control configuration database having the remote control programming code to the set top box.

4. A method as recited in claim 3 wherein broadcasting comprises continually broadcasting the remote control configuration database.

5. A method as recited in claim 3 wherein broadcasting comprises broadcasting the remote control configuration database from a satellite.

6. A method as recited in claim 3 wherein broadcasting comprises broadcasting the remote control configuration database through a terrestrial communication network.

7. A method as recited in claim 1 wherein programming a remote control comprises communicating the remote control programming code between the set top box and the remote control.

8. A method as recited in claim 1 wherein programming a remote control comprises communicating the remote control programming code between the set top box and the remote control through a receiver/transmitter module of the set top box.

9. A method as recited in claim 1 further comprising initiating a remote control programming process by selecting a selection at a user interface of the set top box.

10. A method as recited in claim 9 further comprising, after initiating, communicating a query signal from the set top box to the electronic device and wherein the step of communicating the device identifier is performed in response to the step of communicating.

11. A system comprising: a set top box comprising a network communication module receiving a device identifier from an electronic device comprising a model identifier of the electronic device and a manufacturer identifier of the electronic device through an interface; a communication module, after the network communication module receives the device identifier, obtaining a remote control programming code from a remote control configuration database through a terrestrial communication network in response to the model identifier and the manufacturer identifier, said remote control programming code comprises a unique set of numbers or letters for both the model identifier and manufacturer identifier; and a display control module displaying the remote control programming code on a display associated with the set top box; and a remote control receiving button signals corresponding to the remote control programming code corresponding to the unique set of numbers or letters to control the electronic device.

12. A system as recited in claim 11 wherein the communication module receives the remote control programming code from a head end through a satellite.

13. A system as recited in claim 11 wherein the communication receives the remote control programming code from a head end through a terrestrial network.

14. A system as recited in claim 11 wherein the communication module receives the remote control programming code from a head end through a network.

15. A system as recited in claim 11 wherein the set top box comprises a satellite television set top box.

16. A system as recited in claim 11 further comprising a head end broadcasting a remote control configuration database having the remote control programming code.

17. A system as recited in claim 11 further comprising a head end continually broadcasting a remote control configuration database having the remote control programming code.

* * * * *